Figure 1:
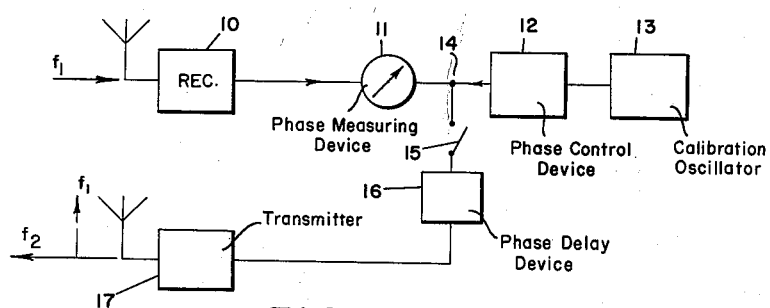

April 21, 1964   CARL-ERIK GRANQVIST   3,130,403
APPARATUS FOR USE IN DISTANCE MEASUREMENT
Filed Sept. 11, 1958                                    2 Sheets-Sheet 1

INVENTOR
CARL-ERIK GRANQVIST
BY Larson and Taylor
ATTORNEYS

United States Patent Office 3,130,403
Patented Apr. 21, 1964

3,130,403
APPARATUS FOR USE IN DISTANCE MEASUREMENT
Carl-Erik Granqvist, Lidingo, Sweden, assignor to Svenska Aktiebolaget Gasaccumulator, Lidingo, Sweden, a corporation of Sweden
Filed Sept. 11, 1958, Ser. No. 760,420
Claims priority, application Sweden Sept. 14, 1957
11 Claims. (Cl. 343—12)

It is known to transmit for distance measuring purposes an electromagnetic wave from one end of the distance to be measured towards the far end thereof, at which the wave is picked up by a receiver which in its turn controls a transmitter for transmitting a similar wave. If the time delay caused between receiver and transmitter at the far end of the distance is known and the time delay between the wave transmitted from the issuing point and the wave received at the same point is measured, it is possible to compute the delay caused by the distance. Such an arrangement pre-supposes that the periodic wave signals generated by the two transmitters are of exactly the same period. This gives rise to substantial constructional problems.

The invention relates to an apparatus of the type referred to above, in which the difficulty characteristic of earlier devices has been removed. The apparatus according to the invention comprises a receiver for receiving a periodic signal of predetermined nature, a transmitter for transmitting a similar periodic signal, a phase measuring device for comparing the phase of the received signal with that of the transmitter signal, and a phase control device responsive to the phase measuring device for controlling the phase of the transmitter signal relative to that of the received signal.

The apparatus according to the invention may be placed at the far end of the distance to be ready to pick up a signal of a predetermined nature. In the simplest case, the signal is sinusoidal, for instance, a modulated carrier wave. The transmitter of the apparatus is adapted to produce a signal of the same type as the one received. However, in accordance with the fundamental concept of the invention, the transmitter does not have to generate precisely the same fundamental frequency as that of the received signal but a small deviation can be tolerated. The main thing is that the transmitter frequency be as constant as possible. The deviation that may occur is compensated for by a phase control device forming part of the apparatus and being responsive to a phase measuring device. The latter compares the phase of the received signal with that of the transmitter signal and generates a control effect in accordance with the difference. The control effect influences the phase control device in such a way that the difference obtains a predetermined value, preferably zero.

According to an advantageous embodiment, the apparatus is adapted during control intervals alternating with the measuring intervals to measure the phase delay caused by the apparatus itself in the translation of the received signal as well as of the generated transmitter signal therethrough. Clearly, this delay is just as important as the transmitter signal phase itself for the phase relation between the received and the retransmitted signal. It may be subject to variations for different reasons. For instance, if the apparatus has a superheterodyne type receiver, the local oscillator may exhibit some frequency drift causing such a phase delay. Also, some side tuning may arise owing to frequency drift in the carrier of the received signal or to fluctuations in circuit constants caused by temperature variations, whereby a variation in the phase delay caused by the apparatus is produced. Provided that these variations occur slowly relative to the repetition rate of the control intervals, the apparatus can be connected automatically during the control intervals so as to make the phase measuring device measure the phase displacement of the apparatus itself and actuate a phase delay device of the apparatus so as to cause the delay thereof to obtain the predetermined value.

Embodiments of the invention are shown on the attached FIGS. 1 to 4.

In the embodiment of the apparatus shown in FIG. 1, a receiver 10 is adapted to receive a sinusoidal signal modulated on a carrier frequency $f_1$. The received signal is applied to a phase measuring device 11, to which there is also applied via a phase control device 12 an output voltage of a calibration oscillator 13, which is constructed with the greatest possible precision so as to generate a signal of constant frequency. With the aid of the device 12 the phase of the oscillator output at the point 14 is adjusted to equality with that of the signal received from the receiver 10. After this, a switch 15 is closed, whereby the point 14 is now connected via a phase delay device 16 to a transmitter 17 adapted to transmit on either of the carrier frequencies $f_1$ or $f_2$. It will be assumed that the transmitter 17 is switched to frequency $f_1$ when the switch 15 is closed. The phase delay device 16 is now adjusted until the phase measuring device 11 again reads zero, which implies, assuming that the phase displacement between the transmitter and receiver antennas is negligible, that the phase displacement in the apparatus in translation of the signal from the receiver antenna via the receiver 10, the phase measuring device 11, the phase delay device 16 and the transmitter 17 to the transmitting antenna is 0. At the end of the control interval, the transmitter frequency is reset at the value $f_2$ and the output signal of the oscillator 13 is then transmitted with the same phase as the received signal.

It should be noted that the phase control device 12 is able to compensate for a constant phase difference between the oscillator 13 and the received signal. Also for the case where a small frequency difference occurs, it is possible for the device 12 to compensate for this by generating a phase difference which varies as a linear function of time, this being easiest to achieve if sinusoidal signals are used. A simple device that can be used for this purpose is the well known type of goniometer with two fixed and mutually perpendicular coils inductively coupled to a movable coil, whose angle of rotation represents the phase displacement of the output voltage relative to the input voltage. The output voltage is taken from the movable coil and the input voltage is applied to the fixed coils with a phase difference of 90°. If we are concerned with a non-sinusoidal signal, a corresponding arrangement having a time delay device replacing the phase control device 12 is possible in principle, even if it is more complicated from a practical viewpoint. It should, furthermore, be noted in connection with FIG. 1 that the switch 15 may be dispensed with if the control of the device 12 is performed during the measuring interval.

The functions described in connection with FIG. 1 can obviously be obtained automatically in a manner similar to what will be described below in connection with FIGS. 2, 3 and 4. It will be readily apparent to one skilled in the art how to include suitable switching and control elements to achieve the required functions in orderly sequence in the same way as will be described in connection with the following figures.

Figure 2:
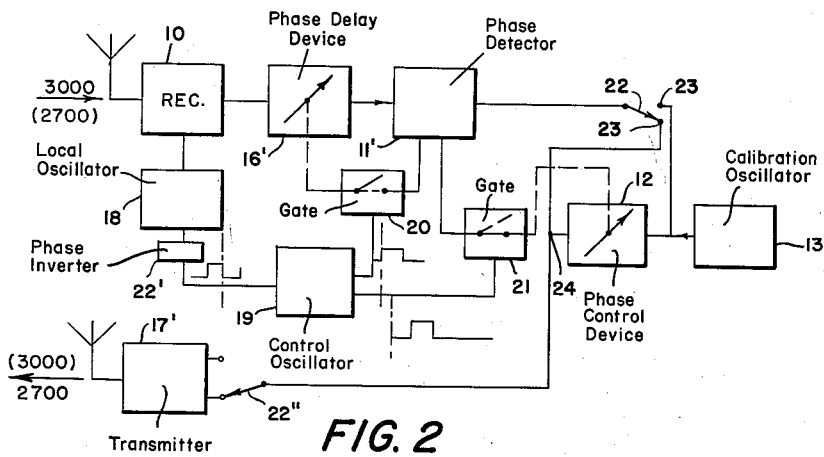

FIG. 2 shows an apparatus with automatic switching between different modes of operation. In this as well as the following figures, a reference number of an earlier figure will be repeated only to designate a unit of the same kind. A prime indicates a similar unit having a modified function.

The FIG. 2 apparatus comprises a receiver 10 adapted to receive a signal having a carrier frequency of 3000 mc./s. when the apparatus is placed at the far end of the measured distance and retransmits a replica of a received signal. As will be clear from the following, the apparatus may also be used at the measuring point, in which case its operation is somewhat modified.

When the apparatus serves to retransmit a received signal, the transmitter 17', in the corresponding position of a switch 22'', has a carrier frequency of 2700 mc./s. The apparatus operates on the superheterodyne principle and has a local oscillator 18 which can oscillate at 2900 or 2800 mc./s. Switching between these two modes of operation takes place by means of a control oscillator 19. This oscillator produces a square wave, which is applied via a phase inverter 22', the function of which will be clear from the following, to the local oscillator and determines the switching thereof between the two modes of operation. The local oscillator may comprise a klystron, the inherent frequency of which may be varied by varying the reflector voltage. If the intermediate frequency section is tuned to 100 mc./s., the receiver will, owing to the frequency switching of the local oscillator, be alternately sensitive to 3000 and to 2700 mc./s.

The output voltage of the control oscillator 19 is further applied to a pair of gates 20 and 21, whereby the gate 20 is opened up during the calibrating intervals and the gate 21 during the measuring intervals. The receiver output signal is applied via the phase delay device 16' to a phase detector 11'. The latter may be of the known type producing an output voltage which is 0 for a certain phase difference, such as 90°, between the inputs and varies, for deviations from this value, substantially proportionally to the deviation within a certain range of variations for the latter. The phase detector 11' yields an output voltage which controls the phase delay device 16' during the conductive intervals of the gate 20 so as to make the voltage applied to the delay device 16' from the phase detector be in phase with the output voltage of the calibrating oscillator 13. This output voltage arrives at the phase delay device after having passed through the phase control device 12 and a switch 22, the latter being constantly in the position 23 shown in the figure as long as the apparatus is used for retransmitting a received signal. On the other hand, during the measuring intervals, the gate 21 is open and the gate 20 is closed. During these intervals, the output voltage of the phase detector 11' is therefore applied to the phase control device 12 to control the latter in such a way as to cause phase equality between the voltage at the point 24 and the output voltage from the delay device 16'.

The apparatus according to FIG. 2 thus achieves by means of the delay device 16' during the control intervals automatic control of the interior phase delay of the apparatus and during the intervening measuring intervals a control of the output voltage phase from the calibrating oscillator 13 takes place through the actuation of the phase control device 12. In this connection, it should be noted that, as was already pointed out in the opening paragraphs, the delay device 16' as well as the control device 12 may produce a linearly varying phase delay, the linear variation of which remains even during the passive intervals of the corresponding device 16' or 12', respectively. In the case of sinusoidal oscillations, this is thus equivalent with a frequency control, since a linear variation of the delay of the device 12 changes the frequency of the output signal of oscillator 13 at the point 24 by a corresponding constant amount. The manner in which this can be done with the aid of a goniometer will be more clearly apparent from the following description of the embodiment according to FIG. 3.

The FIG. 2 apparatus may also be used at the transmitting point. The switch 22'' is then set in its upper position shown in the drawing, in which the transmitter 17' has a carrier frequency of 3000 mc./s. At the same time, the setting of the phase inverter 22' is changed in such a way that the square wave is supplied to the local oscillator with reversed polarity. These changes are necessary to make the apparatus transmit during the measuring intervals on the carrier frequency which the re-transmitting apparatus at the far end is then adapted to receive and to receive on the re-transmitted frequency. The switch 22 is shifted periodically between position 23 during the calibrating intervals and position 23' during the measuring intervals.

The operation of the FIG. 2 apparatus when operating at the measuring point is as follows:

During the calibrating intervals the switch 22 is in position 23, and the delay device 16' is adjusted by the detector 11' so as to make the round-trip delay in the apparatus zero, including the delay possibly caused by drift in the local oscillator 18.

During the measuring intervals, the switch 22 is in the position 23' and the detector 11' actuates the control device 12 to cause the total round-trip signal delay to be again 0 (or $2\pi$ etc.). The round-trip signal path now includes the measured distance and the device 12 in addition to the elements present during the calibrating intervals, and it follows that these added portions of the signal path cause a phase delay of 0 ($2\pi$ ... ). Since the delay of the device 12 is known, that of the measured distance is easily obtained.

Figure 3:
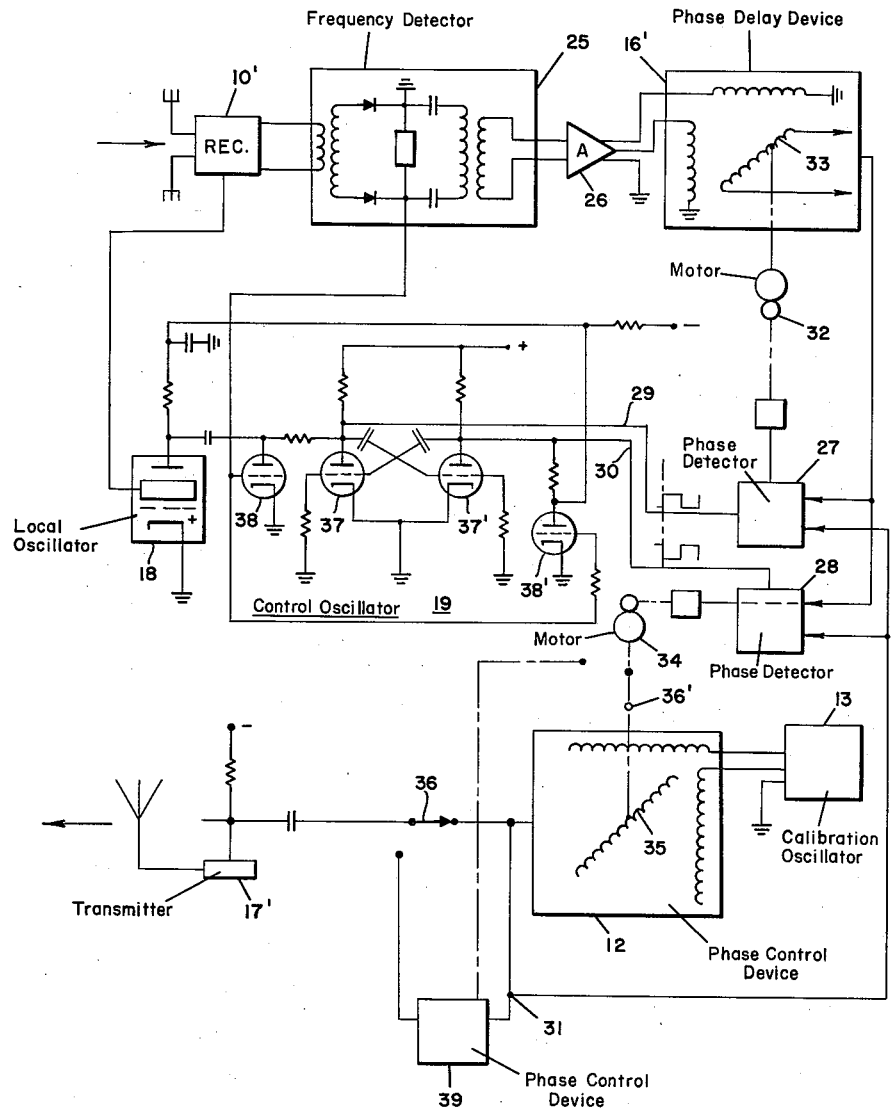

The FIG. 3 apparatus is generally similar to that of FIG. 2 but is adapted for a frequency modulated signal. The receiver 10' is connected to the antenna and comprises a first detector stage, in which a frequency transposition takes place. The receiver output signal is applied to a frequency detector 25 of well-known type, the output voltage of which is applied via an amplifier 26 to the phase delay device 16', which comprises a goniometer. Instead of a pair of gates 20 and 21 shown in FIG. 2, there are according to FIG. 3 a pair of phase detectors 27 and 28, which serve simultaneously as gating circuits owing to the fact that they are alternately made conductive under the influence of the control oscillator 19. The detector 27 receives its control voltage via a conductor 29 and the detector 28 via a conductor 30. Input voltages are applied to the detectors 27 and 28 from the phase delay device 16' as well as from a point 31, at which the output voltage of the calibrating oscillator 13 is present after having passed through the phase control device 12. The latter also consists of a goniometer. The output voltage of the phase detector 27 controls a motor 32 driving the movable coil 33 of the delay device 16'. In a similar manner, the output voltage of the phase detector 28 controls a motor 34 driving the movable coil 35 of the phase control device 12. The output voltage of the device 12 is applied via a switch 36 in the normal position thereof shown in the figure to the transmitter 17', which is assumed to be a klystron, to modulate the frequency of the latter. There is also a switch 36' cooperating with the switch 36 and connecting in its normal position the motor 34 to the coil 35. The switch 36 has a second position, in which an additional phase control device 39 is inserted in the signal path. The cooperating switch 36' has a corresponding second position for connecting the motor 34 to the device 39. These second positions of the switches 36 and 36' are used during the measuring intervals when the apparatus operates at the measuring point.

The control oscillator 19 comprises a pair of triodes 37 and 37' belonging to a well-known type of multivibrator circuit in which the anode of one triode is capacitively coupled back to the control grid of the other. Square waves are obtained at the anodes of the triodes and the conductors 29 and 30 referred to above are connected each to one of the anodes. The square wave from the control oscillator 19 is applied to the local oscillator 18, which is also a klystron, by the triodes 38 and 38', and causes the frequency thereof to alternate between two values as was described in connection with FIG. 2.

The operation of the FIG. 3 apparatus in its general aspects should be apparent from the above presentation in view of the explanation of the operation of the FIG. 2 apparatus. The control oscillator 19 renders the phase detector 27 operative during the control intervals, whereby the latter then actuates the motor 32 to make it adjust or rotate the coil 33 at a substantially constant speed. During the same interval, the local oscillator 18 has an intermediate frequency of such a value that the oscillation transmitted from the transmitter 17′ is received and is demodulated in the frequency detector 25. It is then applied via the amplifier 26 to the fixed coils of the goniometer 16′. Owing to this control operation, accurate phase equality is maintained between the output voltage of the coil 33 and the output voltage of the calibrating oscillator 13 present at the point 31. A possible phase drift within the apparatus, such as may be caused by frequency drift in the local oscillator 18 or by any other factor, is thus compensated for and, provided that the phase drift in question is substantially linear with regard to time, the compensation will stay effective also during the measuring intervals intervening between the control intervals if the motor 32 has a sufficient amount of inertia to prevent substantial changes in its speed from one measuring interval to another. At the close of the control interval, the measuring interval begins, and the phase detector 28 is then made conductive under the influence of the control oscillator 19 and the phase detector 27 is blocked. The phase detector 28 now controls the phase of the output voltage at the point 31 of the calibrating oscillator 13 with the aid of the motor 34 in a corresponding manner to that of the detector 27, whereby this phase agrees with that of the output voltage from the coil 33. This voltage is applied to the transmitter 17′, more particularly to the reflector electrode thereof, and modulates the retransmitted signal.

The FIG. 3 apparatus can also be used in a similar manner to that of FIG. 2 at the transmitting point. The switch 36 should then be in its lower position during the measuring intervals. In addition, the frequencies of the local oscillator and of the transmitter 17′ are to be modified in accordance with what was described in connection with FIG. 2. The operation of the apparatus is in accordance with that of the FIG. 2 apparatus. During the measuring intervals, the delay of the device 39 is adjusted by the detector 28 in accordance with the delay of the measured distance.

Figure 4:
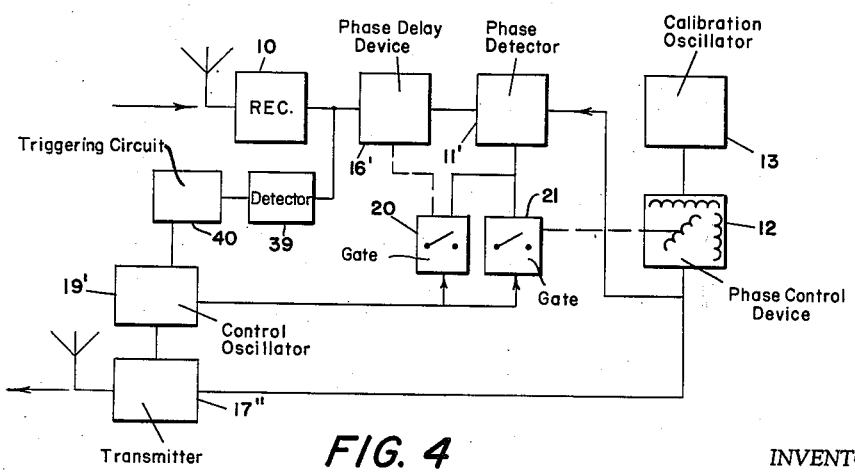

FIG. 4 shows a modified apparatus without local oscillator, in which the transmitter 17″ is switched between two transmitting frequencies in response to actuation by the control oscillator 19′. The received signal passes from the receiver 10 via a phase delay device 16′ to the phase detector 11′, to which there is also applied the output voltage of the calibrating oscillator 13 via the phase control device 12. A pair of gating circuits 20 and 21 are controlled by the control oscillator 19′ in the same manner as was described in connection with FIG. 2. However, the control oscillator 19′ is modified inasmuch as it is normally in its receiving position and is switched into its control interval position only upon termination of the signal arriving at the receiver 10. Such termination actuates a detector 39 connected to the receiver so as to make it actuate a triggering circuit 40, which then produces a triggering pulse. The triggering pulse is applied to the control oscillator 19′ to make it initiate the calibrating interval. This interval lasts for a predetermined time, after which the control oscillator 19′ is automatically returned to its normal condition.

What is claimed is:

1. Apparatus for use in distance measurement by means of electromagnetic wave signals, comprising a receiver for receiving a periodic signal of predetermined nature, a transmitter for transmitting a periodic signal of the same nature as the one received, a phase measuring device for comparing the phase of the transmitter signal with that of the received signal, a phase control device, and automatic switching means for causing the phase control device during predetermined intervals to respond to the phase measuring device for controlling the phase of the transmitter signal relative to that of the received signal, said phase control device having a measure of inertia proportioned relative to the switching rate of said automatic switching means whereby said phase control device maintains between said predetermined intervals a substantially constant rate of phase change, thereby to counteract any frequency difference between said received and said transmitted periodic signal.

2. Apparatus as claimed in claim 1, in which a phase-delay device is in the signal path of the apparatus and switching means are additionally provided for switching the apparatus during recurrent control intervals occurring between the said predetermined intervals into an operating condition, in which said phase detector controls said phase-delay device so as to adjust the round-trip phase delay of the apparatus to a predetermined value.

3. Apparatus as claimed in claim 1, in which the phase control device comprises a motor-driven goniometer, the motor of which is actuated by the phase detector.

4. Apparatus as claimed in claim 2, in which the receiver is of the superheterodyne type and comprises a local oscillator having an operating frequency during the control intervals different from the normal oscillator frequency, thereby to adapt the receiver to intercept during the control intervals the transmitter signal.

5. Apparatus as claimed in claim 4 in which said automatic switching means comprises control oscillator means for simultaneously controlling the frequency of the local oscillator and the connection of the phase delay device alternately to the phase control device and to the phase detector.

6. Apparatus as claimed in claim 5, in which the control oscillator means produces a square wave which is applied as a frequency control voltage to the local oscillator.

7. Apparatus for receiving and re-transmitting a periodic signal of predetermined nature, comprising a receiver for said signal, an oscillator for producing a similar signal, a transmitter for transmitting the oscillator signal, a phase-delay device in the signal path of the apparatus, automatic switching means causing the apparatus during predetermined intervals to receive the transmitter signal, and a phase detector means responsive during said intervals to the oscillator and received transmitter signals to generate a control signal, and to apply said control signal to said phase-delay device to adjust the round-trip phase delay of the apparatus to a predetermined value.

8. An apparatus as claimed in claim 7, and further comprising an additional phase-control device, and auxiliary switching means for modifying the operation of the apparatus during measuring intervals intervening between said predetermined intervals by causing the oscillator to be unresponsive to the phase detector and connecting in the apparatus signal path said additional phase control device responsive to the phase detector, thereby to enable a distance measurement to be obtained from the reading of the additional phase control device.

9. Apparatus as claimed in claim 1 comprising an additional phase-control device, and additional switching means for modifying the operation thereof during said predetermined intervals by connecting said additional phase-control device in the signal path thereof and causing the phase of the oscillator to be unresponsive and said phase-control device to be responsive to the phase detector to produce a delay in dependence upon the sought-for distance.

10. Apparatus as claimed in claim 7, in which said phase-delay device has a degree of intertia proportioned relative to the frequency of the operative intervals thereof, whereby the phase-delay device is adapted to change its phase delay linearly at a substantially constant rate, thereby to compensate for possible frequency drift in the apparatus.

11. Apparatus as claimed in claim 10, in which the receiver is of the superheterodyne type and the local oscillator thereof tends to drift undesirably away in frequency from a desired frequency value, the rate of said drift being below a predetermined value and said predetermined intervals being repeated at a rate substantially higher than said predetermined value.

References Cited in the file of this patent

UNITED STATES PATENTS

| | | |
|---|---|---|
| 2,198,113 | Holmes | Apr. 23, 1940 |
| 2,248,727 | Strobel | July 8, 1941 |
| 2,591,731 | Shapiro | Apr. 8, 1952 |
| 2,783,371 | Frank | Feb. 26, 1957 |

FOREIGN PATENTS

| | | |
|---|---|---|
| 715,347 | Great Britain | Sept. 15, 1954 |